(12) United States Patent
Ho

(10) Patent No.: US 6,819,078 B2
(45) Date of Patent: Nov. 16, 2004

(54) SPACE VECTOR PWM MODULATOR FOR PERMANENT MAGNET MOTOR DRIVE

(75) Inventor: Eddy Ying Yin Ho, Torrance, CA (US)

(73) Assignee: International Rectifier Corporation, El Segundo, CA (US)

(*) Notice: Subject to any disclaimer, the term of this patent is extended or adjusted under 35 U.S.C. 154(b) by 0 days.

(21) Appl. No.: 10/684,542

(22) Filed: Oct. 14, 2003

(65) Prior Publication Data

US 2004/0130918 A1 Jul. 8, 2004

Related U.S. Application Data

(60) Provisional application No. 60/418,733, filed on Oct. 15, 2002.

(51) Int. Cl.[7] .................................................. H02D 5/40
(52) U.S. Cl. ......................................... 318/808; 323/811
(58) Field of Search ................................. 318/808, 810, 318/811, 812; 363/41

(56) References Cited

U.S. PATENT DOCUMENTS

| | | | | |
|---|---|---|---|---|
| 6,023,417 A | * | 2/2000 | Hava et al. | 318/811 |
| 6,462,974 B1 | * | 10/2002 | Jadric | 363/132 |
| 6,483,271 B1 | * | 11/2002 | Thebeau et al. | 318/802 |
| 6,570,780 B2 | * | 5/2003 | Furukawa et al. | 363/98 |
| 6,643,149 B2 | * | 11/2003 | Arnet et al. | 363/41 |
| 6,768,284 B2 | * | 7/2004 | Lee et al. | 318/808 |

* cited by examiner

*Primary Examiner*—Bao Q. Vu
(74) *Attorney, Agent, or Firm*—Ostrolenk, Faber, Gerb & Soffen, LLP

(57) ABSTRACT

A space vector pulse-width modulator (SVPWM) and a method implemented by the modulator. A precalculation module accepts Ua and Ub modulation indexes and in response thereto, outputs modified Ua and Ub information; a sector finder has a U module which receives the modified Ua information and outputs a U sector; and a Z module which receives the U sector and the modified Ub information and outputs a Z sector. The U sector and the Z sector are 2-phase control signals for implementing 2-phase modulation. For 3-phase modulation, the SVPWM and method further possess an active vectors calculation module and an assign vectors module which receive the modified Ua and Ub information and the U sector, and which calculate active vectors for 3-phase modulation; a zero vector selector which receives the Z sector and calculates zero vectors for 3-phase modulation; and a PWM counter block which receives the active vectors and zero vectors and outputs 3-phase control signals for implementing 3-phase modulation. The SVPWM and method may have a symmetrical PWM mode, an asymmetrical PWM mode, or both. Advantageously there may also be a rescale and overmodulation module which receives duration information corresponding to the vectors and in response thereto, detects the occurrence of overmodulation. Overmodulation may be detected in response to a negative zero vector time. The module may respond to overmodulation by clamping the zero vector time to zero and rescaling the active vector times to fit within the PWM cycle. The rescaling may restrict a voltage vector to stay within hexagonal boundaries on the space vector plane, while preserving voltage phase.

17 Claims, 8 Drawing Sheets

3-phase and 2-phase modulation

Fig. 1 3-phase and 2-phase modulation
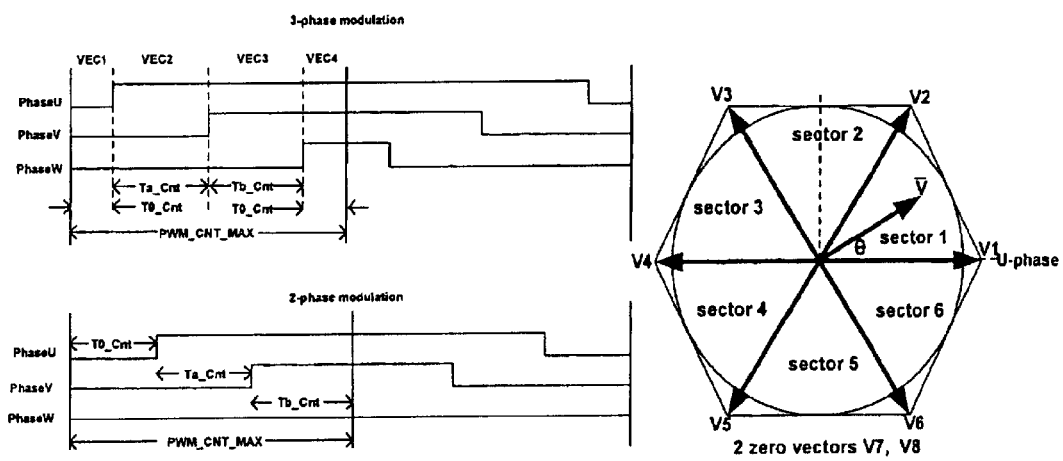

Fig. 2 Space Vector PWM block structure
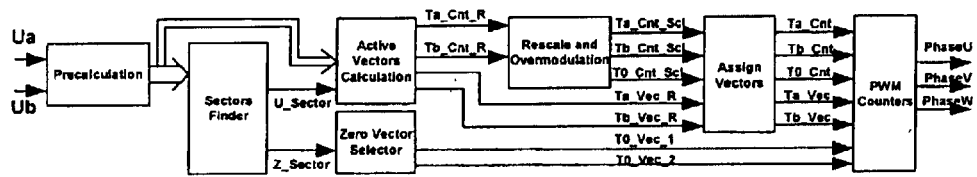

Fig. 3 Precalculation and Sectors Finder
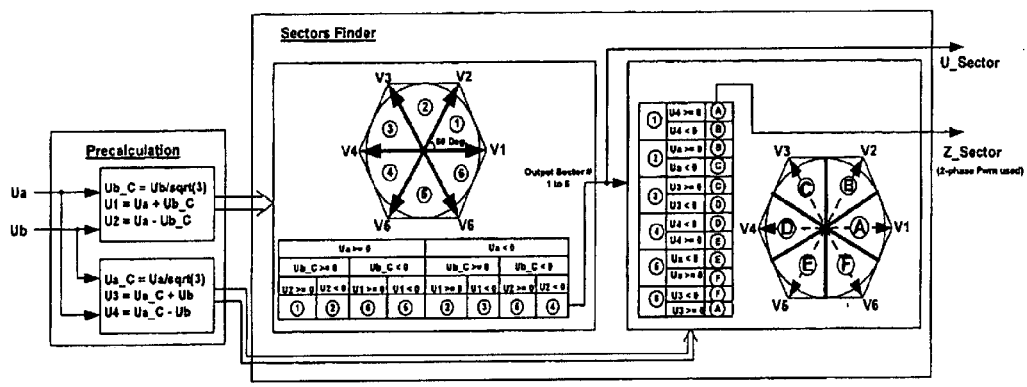

Fig. 4 Active Vectors Calculation
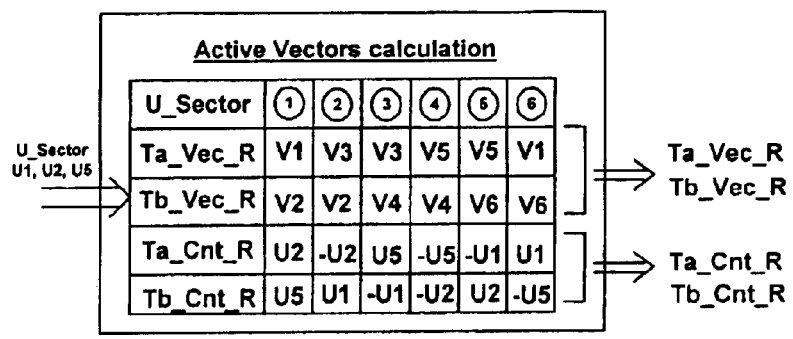

Fig. 5 Rescale and Overmodulation
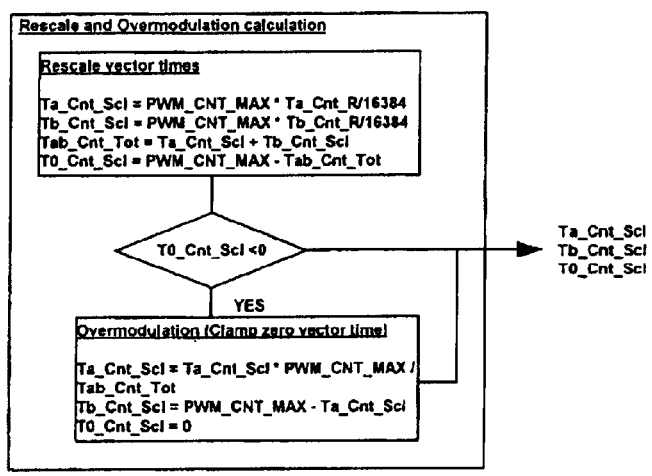

Fig. 6 Overmodulation in Space Vector Plane
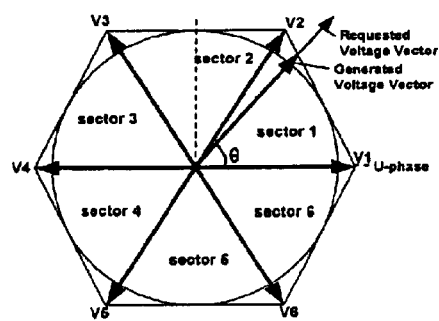

Fig. 7 Zero Vector Selector
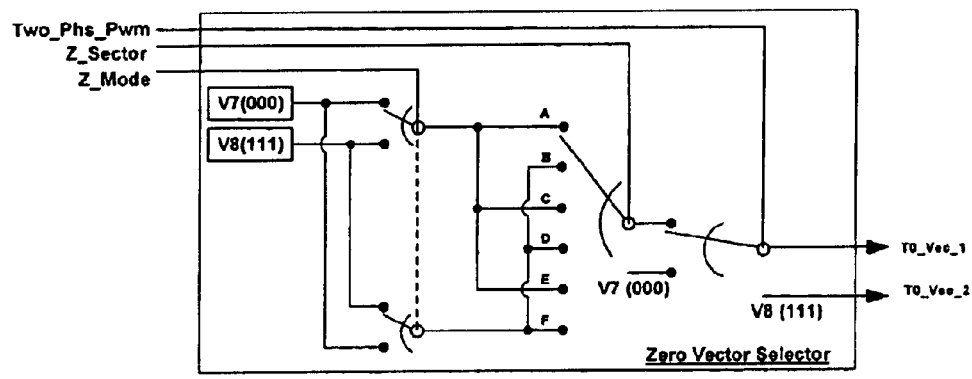

Fig. 8 PWM state sequencer
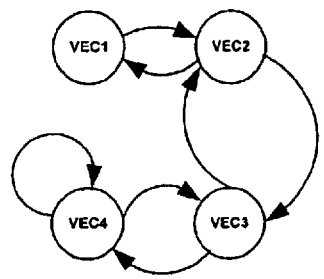

SPACE VECTOR PWM MODULATOR FOR PERMANENT MAGNET MOTOR DRIVE

CROSS-REFERENCE

This application is based on and claims priority of U.S. Provisional Application Ser. No. 60/418,733 filed Oct. 15, 2002, incorporated by reference.

BACKGROUND OF THE INVENTION

1. Field of the Invention

The invention relates to a motor drive, and more particularly to a drive method and system for a permanent magnet surface-mount (PMSM) motor utilizing a space-vector PWM modulation scheme.

2. Description of the Related Art

Three-phase motor drives utilizing inverters are well known in the industry. Typically a DC bus supplies switched power to different phases of an AC motor. For supplying switching commands and sequences to the inverter, sensorless vector control is achieving wide attention. Sensorless control eliminates speed, flux and torque sensors and replaces them with DSP-based estimation based on the measured terminal voltages and currents. Thus, the cost of the drive is reduced and reliability is enhanced. A DSP-based motor drive of background interest is described in the present inventor's U.S. Application Serial No. 60/465,890 filed Apr. 25, 2003; and Ser. No. 10/294,201 filed Nov. 12, 2002, incorporated by reference. However, the estimation algorithms tend to be complex, particularly at low frequencies.

Space-vector pulse-width modulation (SVM) has become a popular form of pulse-width modulation (PWM) for voltage-fed converter drives because of its superior harmonic quality and extended linear range of operation. SVM arrangements of background interest are described in Ser. No. 10/402,107 filed Mar. 27, 2003, incorporated by reference.

However, one problem of SVM is that it requires complex on-line computation that usually limits its operation to switching frequencies of up to several kilohertz (e.g. about 10 kHz). Switching frequency can be extended by using high-speed DSP and simplified algorithms including lookup tables (LUT). Power semiconductor switching speeds, particularly in IGBT's, have been improving dramatically. However, the use of LUT's, unless very large, tends to reduce pulse-width resolution.

SUMMARY OF THE INVENTION

The present invention avoids the intensive calculations such as arctan and square root functions and lookup tables in the conventional space vector PWM modulation scheme. An algorithm structure is proposed for the implementation of a versatile space vector PWM scheme, which can generate both 3-phase and 2-phase SVPWM without intensive math functions or lookup tables. This structure supports overmodulation, symmetrical PWM and asymmetrical PWM modes.

The invention implements a versatile 2-level space vector PWM (SVPWM) modulator, which allows 3-phase and 2-phase modulation algorithms to be implemented in a common algorithm structure. The implementation utilizes mainly decision logic and does not require any intensive math functions such as arctan, sine, cosine and/or square root functions. The algorithm provides overmodulation, symmetrical and asymmetrical mode capabilities.

The invention provides a space vector pulse-width modulator and a method implemented by the modulator.

According to an aspect of the invention, a space vector pulse-width modulator (SVPWM) may comprise a precalculation module which accepts Ua and Ub modulation indexes and in response thereto, outputs modified Ua and Ub information.

According to another aspect of the invention, a SVPWM may comprise a sector finder having a U module which receives Ua or modified Ua information and outputs a U sector; and a Z module which receives the U sector and Ub or modified Ub information and outputs a Z sector; said U sector and said Z sector being 2-phase control signals for implementing 2-phase modulation.

According to another aspect of the invention, a SVPWM may comprise, for 3-phase modulation, an active vectors calculation module and an assign vectors module which receive Ua and Ub or modified Ua and Ub information and a U sector, and which calculate active vectors for 3-phase modulation; a zero vector selector which receives said Z sector and calculates zero vectors for 3-phase modulation; and a PWM counter block which receives said active vectors and zero vectors and outputs 3-phase control signals for implementing 3-phase modulation.

The PWM counter block preferably has a symmetrical PWM mode, an asymmetrical PWM mode, or both.

The SVPWM may further comprise a rescale and overmodulation module which receives duration information corresponding to vectors and in response thereto, detects the occurrence of overmodulation. Overmodulation is preferably detected in response to a negative zero vector time. The module may respond to overmodulation by clamping a zero vector time to zero and rescaling active vector times to fit within a PWM cycle.

Said resealing may restrict a voltage vector to stay within hexagonal boundaries on the space vector plane, while preserving voltage phase.

According to another aspect, the invention provides a method carrying out at least the steps outlined above.

Other features and advantages of the present invention will become apparent from the following description of embodiments of the invention which refers to the accompanying drawings.

BRIEF DESCRIPTION OF THE DRAWING(S)

FIG. 1 is a diagram illustrating 3-phase and 2-phase modulation schemes.

FIG. 2 is a structural block diagram of the versatile space vector PWM modulator.

FIG. 3 shows the precalculation and sector finder blocks of FIG. 2 in more detail.

FIG. 4 shows the active vectors calculation block of FIG. 2 in more detail.

FIG. 5 shows the rescale and overmodulation block of FIG. 2 in more detail.

FIG. 6 is a diagram illustrating overmodulation.

FIG. 7 shows the zero vector selector block of FIG. 2 in more detail.

FIG. 8 shows the sequence of states.

DETAILED DESCRIPTION OF EMBODIMENTS OF THE INVENTION

Following is a description of an example of the PWM scheme.

3-phase and 2-phase PWM modulation schemes are shown in FIG. 1. The Volt-sec generated by the two PWM strategies are identical. However, with 2-phase modulation, the switching losses can be reduced significantly, especially when high switching frequency (>10 kHz) is employed.

FIG. 2 shows the structural block diagram of the Versatile Space Vector PWM modulator. The design of each block will be described below in more detail. The features of this SVPWM are:

Implementation does not require Arctan, Sine, Cosine or Square root functions

Accepts rectangular inputs Ua and Ub (can easily interface to most Vector Controllers)

Zero vectors can be selected as desired

Simple overmodulation scheme by zero vector time clamping

Automatic Symmetrical and Asymmetrical mode generation by half PWM cycle updating.

FIG. 3 shows details of the calculations in the Precalculation and Sector Finder blocks of FIG. 2. The input of the SVPWM accepts modulation indexes Ua and Ub (orthogonal) and the outputs are U_Sector and Z_Sector (which are used for 2-phase modulation only). The sector regions are defined in FIG. 3. The sector finder is entirely based on decision logic, which provides ease of implementation for a digital hardware platform such as an FPGA.

The outputs are U_Sector and Z_Sector, which are defined as follows:
U_Sector
1 0<=theta<60
2 60<=theta<120
3 120<=theta<180
4 180<=theta<240
5 240<=theta<300
6 300<=theta<360
Z_Sector
A −30<=theta<30
B 30<=theta<90
C 90<=theta<150
D 150<=theta<210
E 210<=theta<270
F 270<=theta<330

FIG. 4 shows details of the calculation in the Active Vectors Calculation block of FIG. 2. This calculation is mainly assignment. There is no intensive calculation involved.

FIG. 5 shows the Rescale and Overmodulation block. Overmodulation is detected by a negative value on the calculation of zero vector time (T0_Cnt_Scl). By clamping the zero vector time to zero (if negative) and rescaling the active vector times to fit within the PWM cycle, overmodulation can be handled easily. This rescaling restricts a voltage vector to stay within the hexagon limit on the Space Vector plane (FIG. 6). The magnitude of the requested voltage is restricted to the maximum possible voltage limit (the hexagon in FIG. 6). However, the voltage phase is always preserved.

FIG. 7 shows the details of the zero vector selector block. In FIG. 1, for the first half of PWM cycle (PWM_CNT_MAX) there are two zero vector states for 3-phase modulation and one zero vector state for 2-phase PWM. For 3-phase PWM, the first zero vector state is always V7 and the second is V8. However, for 2-phase PWM, the one zero vector state can be V7 or V8 depending on where the voltage vector locates (Z_Sector). Therefore a zero vector selector is implemented to handle various zero vector possibilities.

The PWM counter block in FIG. 2 implements the PWM gating commands (PhaseU, PhaseV, PhaseW). The block has a state sequencer which steps through the different states (VEC1 to VEC4 shown in FIG. 1). The VEC1 and VEC4 states both implement zero vectors and VEC2 and VEC3 implement active vectors. For every half PWM cycle, the inputs to the PWM counter block are sampled once, which allows asymmetrical PWM mode operation to be implemented inherently without any reconfiguration.

For 3-phase modulation, the state sequencer implements VEC1—VEC2—VEC3—VEC4—VEC4—VEC3—VEC2—VEC1 as shown in FIG. 8. In the VEC1 state, the first zero vector will be implemented based on T0_Vec_1 and T0_Cnt. There are three PWM counters, two for active vectors and the third for the two zero vectors. For a 2-phase PWM modulation scheme the state sequencer does not enter state VEC4 (VEC1—VEC2—VEC3—VEC3—VEC2—VEC1).

There are two active vectors present for each half PWM cycle. The "Assign Vector" block (FIG. 2) determines which of the two active vectors should be used to implement the states VEC2 and VEC3. The zero vector time (T0_Cnt) is half when 3-phase PWM is selected.

DEFINITIONS

Ua—Alpha axis modulation
Ub—Beta axis modulation
U_Sector—Sector number 1 to 6 as shown in FIG. 3 (each sector 60 Deg)
Z_Sector—Sector number A to F as shown in FIG. 3 (each sector 60 Deg)
Ta_Cnt_R—Normalized time duration for active vector A
Tb_Cnt_R—Normalized time duration for active vector B
Ta_Vec_R—Active vector A (V1 to V6) for formation of command modulation vector
Tb_Vec_R—Active vector B (V1 to V6) for formation of command modulation vector
T0_Vec_1—Zero vector (V7 or V8) being used in state VEC1
T0_Vec_2—Zero vector (V7 or V8) being used in state VEC4
Ta_Cnt_Scl—Rescaled version of Ta_Cnt_R
Tb_Cnt_Scl—Rescaled version of Tb_Cnt_R
T0_Cnt_Scl—Rescaled version of zero vector normalized time
Ta_Cnt—Counter time duration for state VEC2
Tb_Cnt—Counter time duration for state VEC3
T0_Cnt—Counter time duration for state VEC1 and VEC4
Ta_Vec—Vector being used in state VEC2
Tb_Vec—Vector being used in state VEC3
Two_Phs_Pwm—Select between 3-phase or 2-phase modulation
Z_Mode—2-phase modulation zero vector selection mode Although the present invention has been described in relation to particular embodiments thereof, many other variations and modifications and other uses will become apparent to those skilled in the art. Therefore, the present invention is not limited by the specific disclosure herein.

What is claimed is:

1. A space vector pulse-width modulator (SVPWM) comprising:
   a precalculation module which accepts Ua and Ub modulation indexes and in response thereto, outputs modified Ua and Ub information;
   a sector finder having a U module which receives the modified Ua information and outputs a U sector; and a Z module which receives the U sector and the modified Ub information and outputs a Z sector;

said U sector and said Z sector being 2-phase control signals for implementing 2-phase modulation; and for 3-phase modulation, said SVPWM further comprising:

an active vectors section which receives said modified Ua and Ub information and said U sector, and which calculates active vectors for 3-phase modulation;

a zero vector selector which receives said Z sector and calculates zero vectors for 3-phase modulation; and a PWM counter block which receives said active vectors and zero vectors and outputs 3-phase control signals for implementing 3-phase modulation.

2. The SVPWM of claim 1, wherein said active vectors section comprises an active vectors calculation module and an assign vectors module.

3. The SVPWM of claim 1, wherein said PWM counter block has a symmetrical PWM mode.

4. The SVPWM of claim 3, wherein said PWM counter block has an asymmetrical PWM mode.

5. The SVPWM of claim 1, wherein said PWM counter block has an asymmetrical PWM mode.

6. The SVPWM of claim 1, further comprising a rescale and overmodulation module which receives duration information corresponding to said vectors and in response thereto, detects the occurrence of overmodulation.

7. The SVPWM of claim 6, wherein overmodulation is detected in response to a negative zero vector time.

8. The SVPWM of claim 7, wherein said rescale and overmodulation module responds to overmodulation by clamping the zero vector time to zero and resealing the active vector times to fit within the PWM cycle.

9. The SVPWM of claim 8, wherein said resealing restricts a voltage vector to stay within hexagonal boundaries on the space vector plane, while preserving voltage phase.

10. A method of implementing space vector pulse-width modulation (SVPWM) comprising the following steps:

a precalculation step which accepts Ua and Ub modulation indexes and in response thereto, outputs modified Ua and Ub information;

a sector finder step which includes the step of receiving the modified Ua information and outputting a U sector; and the step of receiving the U sector and the modified Ub information and outputting a Z sector;

wherein said U sector and said Z sector are 2-phase control signals for implementing 2-phase modulation; and for 3-phase modulation, said SVPWM further comprising the following steps:

an active vectors calculation step which includes receiving said modified Ua and Ub information and said U sector, and calculating active vectors for 3-phase modulation;

a zero vector selection step which includes receiving said Z sector and calculating zero vectors for 3-phase modulation;

a PWM counting step which includes receiving said active vectors and zero vectors and outputting 3-phase control signals for implementing 3-phase modulation.

11. The method of claim 10, wherein said PWM counting step implements a symmetrical PWM mode.

12. The method of claim 11, wherein said PWM counting step implements an asymmetrical PWM mode.

13. The method of claim 10, wherein said PWM counting step implements an asymmetrical PWM mode.

14. The method of claim 10, further comprising an overmodulation detecting step which receives duration information corresponding to said vectors, and in response thereto, detects the occurrence of overmodulation.

15. The method of claim 14, wherein overmodulation is detected in response to a negative zero vector time.

16. The method of claim 15, wherein said method responds to overmodulation by the steps of clamping the zero vector time to zero and rescaling the active vector times to fit within the PWM cycle.

17. The method of claim 16, wherein said resealing step restricts a voltage vector to stay within hexagonal boundaries on the space vector plane, while preserving voltage phase.

* * * * *